US012647361B2

(12) United States Patent
Lee et al.

(10) Patent No.: US 12,647,361 B2
(45) Date of Patent: Jun. 2, 2026

(54) SWITCH-ORIGINATED CONGESTION MESSAGES

(71) Applicant: Intel Corporation, Santa Clara, CA (US)

(72) Inventors: Junggun Lee, Los Altos, CA (US); Jeremias Blendin, Santa Cruz, CA (US); Yanfang Le, Madison, WI (US); Rong Pan, Saratoga, CA (US); Mark Debbage, Santa Clara, CA (US); Robert Southworth, Chatsworth, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/561,839

(22) Filed: Dec. 24, 2021

(65) Prior Publication Data

US 2022/0124035 A1 Apr. 21, 2022

Related U.S. Application Data

(60) Provisional application No. 63/184,733, filed on May 5, 2021.

(51) Int. Cl.
H04L 12/26 (2006.01)
H04L 41/34 (2022.01)
(Continued)

(52) U.S. Cl.
CPC .............. H04L 47/12 (2013.01); H04L 41/34 (2022.05); H04L 43/0817 (2013.01);
(Continued)

(58) Field of Classification Search
CPC . H04L 47/12; H04L 43/0817; H04L 43/0882; H04L 43/0888; H04L 47/2483;
(Continued)

(56) References Cited

U.S. PATENT DOCUMENTS

| | | | |
|---|---|---|---|
| 7,180,862 B2 * | 2/2007 | Peebles | H04L 47/24 370/235 |
| 7,657,672 B2 * | 2/2010 | Kampmann | H04L 47/26 710/52 |

(Continued)

FOREIGN PATENT DOCUMENTS

EP 3809646 A1 4/2021

OTHER PUBLICATIONS

International Search Report and Written Opinion for PCT Patent Application No. PCT/US22/21794, Mailed Jul. 7, 2022, 9 pages.

(Continued)

*Primary Examiner* — Phuongchau Ba Nguyen
(74) *Attorney, Agent, or Firm* — Compass IP Law PC

(57) ABSTRACT

Examples described herein relate to a switch circuitry that includes circuitry to determine if a received packet comprises a control packet; circuitry to determine congestion metrics based on receipt of at least one control packet, wherein the at least one control packet comprises a Request To Send (RTS) or Clear To Send (CTS); and circuitry to transmit at least one of the congestion metrics in at least one packet to a sender and/or receiver network interface device.

15 Claims, 5 Drawing Sheets

(51) Int. Cl.

| | |
|---|---|
| *H04L 43/0817* | (2022.01) |
| *H04L 43/0882* | (2022.01) |
| *H04L 43/0888* | (2022.01) |
| *H04L 47/12* | (2022.01) |
| *H04L 47/2483* | (2022.01) |

(52) U.S. Cl.
CPC ...... *H04L 43/0882* (2013.01); *H04L 43/0888* (2013.01); *H04L 47/2483* (2013.01)

(58) Field of Classification Search
CPC ....... H04L 41/34; H04L 43/065; H04L 47/10; H04L 47/2441; H04L 47/30; H04L 47/32; H04L 12/5693
See application file for complete search history.

(56) References Cited

U.S. PATENT DOCUMENTS

| | | | | |
|---|---|---|---|---|
| 7,680,039 B2 * | 3/2010 | Ho | | H04L 47/11 |
| | | | | 370/230 |
| 7,911,960 B1 * | 3/2011 | Aydemir | | H04L 49/506 |
| | | | | 370/364 |
| 9,894,013 B2 * | 2/2018 | Aravinthan | | H04L 49/3027 |
| 10,218,625 B2 * | 2/2019 | Chao | | H04L 43/14 |
| 10,389,646 B2 * | 8/2019 | Zdornov | | H04L 47/621 |
| 10,812,634 B2 * | 10/2020 | Asterjadhi | | H04L 5/0091 |
| 11,909,644 B2 * | 2/2024 | Mindler | | H04L 43/16 |
| 2001/0032269 A1 * | 10/2001 | Wilson | | H04L 47/193 |
| | | | | 709/238 |
| 2003/0165148 A1 * | 9/2003 | Bishard | | H04L 47/263 |
| | | | | 370/230.1 |
| 2008/0273546 A1 * | 11/2008 | Johnson | | H04L 49/257 |
| | | | | 370/419 |
| 2010/0182905 A1 | 7/2010 | Matsushita et al. | | |
| 2011/0026401 A1 * | 2/2011 | Wakuda | | H04L 65/80 |
| | | | | 370/235 |
| 2014/0022895 A1 * | 1/2014 | Matthews | | H04L 49/251 |
| | | | | 370/392 |
| 2019/0058747 A1 * | 2/2019 | Lindgren | | H04N 21/25808 |
| 2019/0342811 A1 | 11/2019 | Stauffer et al. | | |
| 2019/0379610 A1 * | 12/2019 | Srinivasan | | H04L 47/627 |
| 2020/0162962 A1 * | 5/2020 | Li | | H04W 28/0236 |
| 2020/0213232 A1 | 7/2020 | Srivastava et al. | | |
| 2020/0280518 A1 | 9/2020 | Lee et al. | | |
| 2021/0112002 A1 | 4/2021 | Pan et al. | | |
| 2021/0119930 A1 | 4/2021 | Debbage et al. | | |
| 2021/0320866 A1 | 10/2021 | Le et al. | | |
| 2022/0014478 A1 | 1/2022 | Lee et al. | | |
| 2022/0078119 A1 | 3/2022 | Goyal et al. | | |

OTHER PUBLICATIONS

Arslan, Serhat and McKeown, Nick, "Switches Know the Exact Amount of Congestion", BS 'Dec. 2-3, 19, 2019, Palo Alto, CA, USA, 6 pages.

Desanti, Claudio, "802.1Qbb—Priority-based Flow Control", https://1.ieee802.org/dcb/802-1qbb/, Mar. 27, 2008, 2 pages.

Geeksforgeeks, "Difference between RTS/CTS and DTR/DSR flow control", https://www.geeksforgeeks.org/difference-between-rts-cts-and-dtr-dsr-flow-control/, Last updated Nov. 11, 2020, 2 pages.

KeyCDN Support, "What is TCP Slow Start", https://www.keycdn.com/support/tcp-slow-start, Oct. 4, 2018, 3 pages.

Li, Yuliang et al., "HPCC: High Precision Congestion Control", SIGCOMM '19, Aug. 19-23, 2019, Beijing, China, 15 pages.

Extended European Search Report for Patent Application No. 22799259.1, Mailed Feb. 3, 2025, 11 pages.

Barnea, Aviv et al., "Scaling Zero Touch RoCE Technology with Round Trip Time Congestion Control", https://developer.nvidia.com/blog/scaling-zero-touch-roce-technology-with-round-trip-time-congestion-control/, Dec. 14, 2021, 10 pages.

Mittal, Radhika et al., "TIMELY: RTT-based Congestion Control for the Datacenter", SIGCOMM '15 Aug. 17-21, 2015, London, United Kingdom, 14 pages.

* cited by examiner

AT SWITCH, RECEIVE PACKET TRANSMITTED FROM SENDER
302

AT SWITCH, ALLOCATE PACKET TO QUEUE AND PORT FOR EGRESS
304

AT SWITCH, DETERMINE CONGESTION METRICS
306

AT SWITCH, TRANSMIT ONE OR MORE CONGESTION METRICS TO SENDER
AND/OR RECEIVER
308

500

SWITCH-ORIGINATED CONGESTION MESSAGES

RELATED APPLICATION

This application claims priority to U.S. Provisional Application No. 63/184,733, filed May 5, 2021. The entire contents of that application are incorporated by reference in its entirety.

BACKGROUND

Data centers provide vast processing, storage, and networking resources to users. For example, automobiles, smart phones, laptops, tablet computers, or internet of things (IoT) devices can leverage data centers to perform data analysis, data storage, or data retrieval. Data centers are typically connected together using high speed networking devices such as network interfaces, switches, or routers.

In a data center, end-to-end (E2E) congestion control is deployed to detect network congestion and react to congestion by lowering the per-flow or per-connection transmission bytes or windows. Priority Flow Control (PFC) is a standard network flow control solution described in IEEE standard 802.1Qbb-2011, which is part of the framework for the IEEE 802.1 Data Center Bridging (DCB) interface. PFC enables flow control over a unified 802.3 Ethernet media interface, or fabric, for local area network (LAN) and storage area network (SAN) technologies. PFC is intended to eliminate packet loss due to congestion on a network link. This allows loss-sensitive protocols, such as Fibre Channel over Ethernet (FCoE), to coexist with traditional loss-insensitive protocols over the same unified fabric. PFC avoids congestion packet drops but can incur side effects such as PFC storm, deadlock, and Head-of-Line blocking in fabric links, which can lower network fabric bandwidth. In some cases, E2E congestion control is too slow to detect and react to congestion in sub-round trip time (RTT).

DETAILED DESCRIPTION

Figure 1:
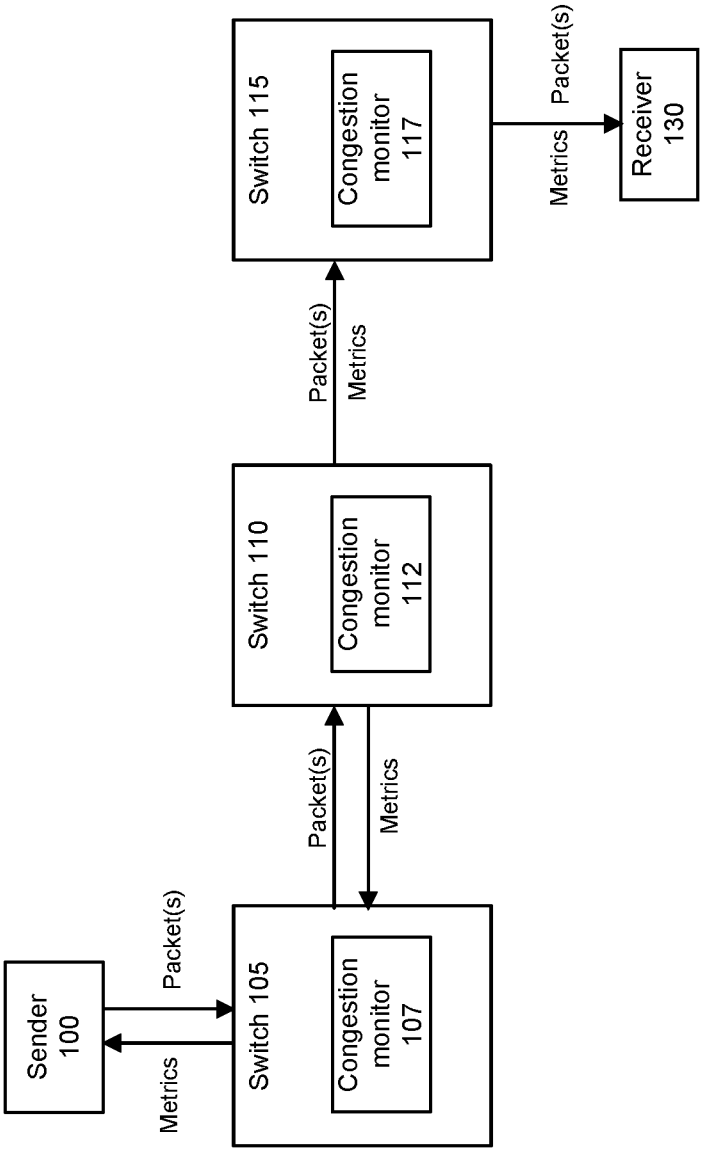
FIG. 1 depicts an example system.

Message Passing Interface (MPI) applications can be used at least in connection with artificial intelligence (AI) training. For MPI applications, based on an MPI_Send call, the sender sends a Request to Send (RTS) control message to a receiver. The receiver can compare the RTS against its expected queue, and if there is no match, the RTS is written to a queue designated for unexpected messages. In response to matching of the message, the receiver can issue a Clear to Send (CTS) to the sender. The CTS can include a remote key (rkey) and remote direct memory access (RDMA) addresses for an application buffer. In response to receipt of the CTS, the sender may perform RDMA Writes directly to the application buffer. The CTS could be an RDMA Read operation.

In cases where multiple senders send to a single receiver, incast congestion can result at the receiver, which can reduce bandwidth of packet transmissions and potentially cause dropping of packets. For a sender to determine what transmission rate to use, solicitation signaling with receiver can take place, such as RTS or CTS. However, signaling CTS involves at least a round-trip time (RTT) amount of time to determine a whether to transmit a packet or message. A delay of RTT to determine whether to send a message can increase application-perceived transmission delay. Alternatively, senders may start transmissions at line rate without receiving CTS, which allows the senders to utilize the available bandwidth from the start but may cause incast congestion.

A switch or switch circuitry can collect congestion and bandwidth metrics based on one or more of: incoming data packets or control packets (e.g., RTS/CTS solicitation). The switch or switch circuitry can provide congestion information to a sender and/or receiver, where the congestion information includes one or more of: per-queue congestion metrics, per-port or queue transmit (TX) rate, arrival rate (e.g., incast rate), number of flows received at the switch, or congestion locator (e.g., node, port, or queue identifiers (IDs)). The switch or switch circuitry can determine to provide congestion information based on one or more of: a queue level crossing above a threshold level, bloom-filter suppression, a current congestion value in the switch is larger than a congestion value carried by a packet by more than a threshold, receipt of a Priority Flow Control (PFC), one or more packet drops, and so forth. The switch or switch circuitry can provide at least a part of the congestion information to a sender and/or receiver using one or more of: in-band with forwarded packets, in one or more signal packets sent to a sender, or a signal sent to the packet receiver network interface device (e.g., at high-priority). The switch or switch circuitry can be positioned as a last-hop switch before a destination receiver network interface device or core switch, such as at ingress from a wide area network (WAN) or egress to a WAN.

In some examples, to reduce incast-induced packet drops and reduce incast queueing delay, a sender can adjust a transmission rate within one baseline round trip time (RTT). RTT can be determined based on a time between transmission of a packet and time of receipt for an associated receipt acknowledgement (ACK) by a receiver network interface device. A baseline RTT can represent a lowest RTT value such as when a network does not transmit packet.

FIG. 1 depicts an example system. Sender 100 can include a network interface device that sends one or more packets to receiver 130, via switch 110, at a request of a host system (not shown, but an example of a host system is described with respect to FIG. 5). A packet may be used herein to refer to various formatted collections of bits that may be sent across a network, such as Ethernet frames, IP packets, Transmission Control Protocol (TCP) segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

A flow can be a sequence of packets being transferred between two endpoints, generally representing a single session using a protocol. Accordingly, a flow can be identified by a set of defined tuples and, for routing purpose, a flow is identified by the two tuples that identify the endpoints, i.e., the source and destination addresses. For content-based services (e.g., load balancer, firewall, Intrusion detection system etc.), flows can be identified at a finer granularity by using N-tuples (e.g., source address, destination address, IP protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

In some examples, switch 115 can be positioned as a last-hop switch before receiver 130. A programmable data-plane pipeline of switch 115 (e.g., congestion monitor 117) can track per-egress-port and/or per-queue congestion metrics to represent (a) level of congestion and (b) available bandwidth (BW) or current transmit (TX) rate. Available BW can include TX rate, link utilization and/or remaining BW. TX rate can be represented per-queue or for a queue and higher-priority queues. Available BW can represent link speed or a total TX rate of a sum of TX rates of queues that provided packets to egress from a port. Congestion metrics can include queuing latency, queue depth, draining/pause time, and/or per-egress-queue arrival rates measured at ingress.

Switch 115 can provide congestion metrics, observed and processed, by congestion monitor 117 of switch 115 at least to sender 100 and/or receiver 130 in response to one or more of: receipt of a control message, congestion control by a queueing system of switch 115 or flow control schemes. Switch 115 can send congestion metrics to one or more other sender devices in addition to sender 100, where such sender devices send packets to a port or queue of switch 110 that is identified to be congested.

Congestion monitor 117 can process priority flow control (PFC) from receiver network interface device 130 as a congestion indicator even before the queue used to transmit packets from switch 115 to receiver 130 fills to or beyond a threshold level indicative of congestion in order to trigger sending of congestion metrics to sender 100 and/or receiver 130. Queue depth can rise for various reasons such as incast from senders (e.g., sender in a wide area network (WAN)), link failure or a sudden start of a high priority queue.

For example, switch 115 can send one or more congestion metrics to sender 100 and/or receiver 130 via one or more packets allocated in a high-priority queue. For example, switch 115 can send one or more congestion metrics to sender 100 by embedding one or more congestion metrics in one or more packets in accordance with one or more of: congestion protocols such as Data Center Quantized Congestion Notification (DCQCN), High-Precision Congestion Control (HPCC), Receiver-based High-Precision Congestion Control (RX-HPCC) utilizing network constructs such as Congestion Notification Packets (CNPs), In-band Network Telemetry (INT) (e.g., P4.org Applications Working Group, "In-band Network Telemetry (INT) Dataplane Specification," Version 2.1 (2020)), Round-Trip-Time (RTT) probes, acknowledgement (ACK) messages, and so forth. For example, switch 115 can utilize packets that convey RTS or CTS control messages to carry one or more congestion metrics from switch 115 to sender 100 and/or receiver 130. Transmitted data packets can carry congestion metric and BW metric from a switch (e.g., switch 115) to sender 100 and/or receiver 130. In some examples, switch 115 can provide congestion metrics with location identifiers (IDs) such as switch ID or IP address, port number, or queue number.

If available BW increases, a switch can send a backward signal to senders or in-band signal to receivers to increase or decrease a transmit rate for a particular flow associated with the received congestion metrics. If congestion and BW metrics are signaled to a receiver (e.g., receiver 130), receiver can notify currently or recently active senders to forward congestion metrics to one or more senders and/or command one or more senders to increase or decrease transmit rate. Metrics can be used for end-to-end (e2e) congestion control (CC).

In some examples, receiver 130 can issue a PFC to a last-hop switch (e.g., switch 115), which can be used by switch 115 to transmit one or more congestion metrics to sender 100 even before a switch queue becomes congested. Switch 105, in a forwarding path from switch 110 to sender 100, can compare its current value of congestion metrics against received congestion metrics. If the congestion metrics are less than congestion metrics observed by congestion monitor 107 of switch 105, switch 105 can propagate congestion metrics observed by congestion monitor 107 of switch 105 to sender 100. Otherwise, switch 105 can propagate congestion metrics from switch 110.

For congestion metrics sent by a switch 110 to receiver 130, switch 115 can propagate congestion metrics observed by congestion monitor 117 of switch 115 to receiver 130 where congestion metrics observed by congestion monitor 117 of switch 115 are greater (indicate more congestion) than those received from switch 110. Otherwise, switch 115 can propagate congestion metrics from switch 110.

If a switch link is under-utilized, a switch may not send congestion metrics to a sender and can store bandwidth metrics in a forward-direction packet so that senders sharing a same link can acquire the available bandwidth as soon as possible.

Switch 105, 110, and/or 115 can be implemented as one or more of: network interface controller (NIC), SmartNIC, router, top of rack (ToR) switch, switch, forwarding element, infrastructure processing unit (IPU), or data processing unit (DPU). Congestion monitor 107, 112, and/or 117 can be implemented using one or more of: processor that perform instructions, application specific integrated circuits (ASICs), field programmable gate arrays (FPGAs), and/or other circuitry.

Sender 100 can utilize received metrics to determine BW available per-queue in order to adjust a transmit rate of packets sent to the queue or port in switch 110 associated with received congestion or bandwidth metrics. For example, when there is higher-priority traffic, the available BW for a queue is smaller than the link bandwidth and can experience large and fast changes over time. Sender 100 can increase or decrease a transmit rate of packets directed to a queue or port associated with the indicated available BW based on the received indication of available BW. In some cases, sender 100 can reduce a packet transmit rate if the congestion metrics indicate congestion is increasing or congestion is identified for a particular queue or port. In some cases, sender 100 can increase a packet transmit rate to a queue or port associated with the indicated one or more congestion metrics if the one or more congestion metrics indicate congestion is lessening. In some examples, sender 100 can adjusts its transmit rate within one baseline-RTT. In some cases, available bandwidth can be utilized at a beginning of a second RTT, instead of using statically configured initial window/rate.

Per-receiver BW information can be stored at the sender network interface device (e.g., sender 100), and can be processed by other connections or applications with traffic to receiver 130 to determine available bandwidth without probing bandwidth by increasing transmit rates.

Sender 100 can be a sender of an n tuple flow, associated with a sender Internet Protocol (IP) address and Differentiated Services Code Point (DSCP), or associated with sender switch identifier (ID), depending on the granularity of signaling and caching/sharing data structure.

Figure 2:
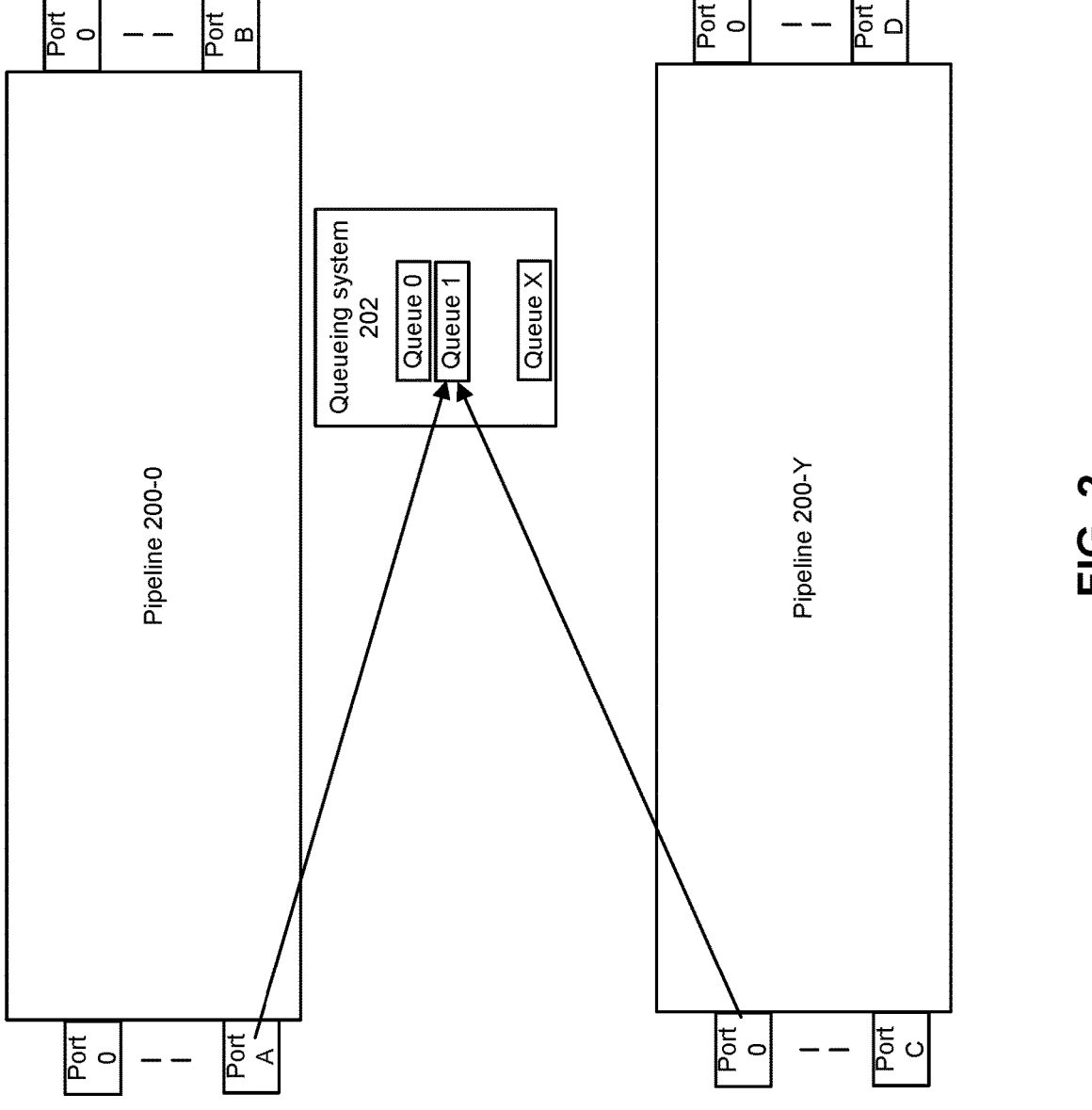
FIG. 2 depicts an example system.

FIG. 2 shows an example pipeline port to queue associations. For example, in queueing system 202, queues 0-X can be made available to store packets received at input ports for pipelines 200-0 to 200-Y, where X and Y are integers of value of 1 or more. Queueing system 202 can allocate queues 0-X to exclusively or non-exclusively store packet traffic from one or more of ingress ports 0-A and 0-C, where A and C are integers of value of 1 or more. For example, queueing system 202 can allocate queue 1 to store packet traffic from port A of pipeline 200-0 and packet traffic from port 0 of pipeline 200-Y. For example, queueing system 202 can allocate other queues to exclusively store packets from an ingress port or to store packets received from multiple ingress ports.

Packets from a queue can be allocated to be transmitted out of an egress port among egress ports 0-B or 0-D, where B and D are integers of value of 1 or more. In some examples, queues share bandwidth allocated to an egress port. High priority queues (e.g., queue 0) can have a precedence over lower priority queues in terms of scheduling of packets from lower priority queues.

A TX rate allocated for a queue may not be sufficient to identify available bandwidth. A TX rate can be associated with a particular queue or an accumulation of bandwidth allocated to a queue and higher-priority queues. In some examples, a congestion metric of available bandwidth for a port can be determined based on: [link speed–total TX rate of the port], where total TX rate of the port can represent a sum of TX rates from queues allocated to a port.

Figure 3:
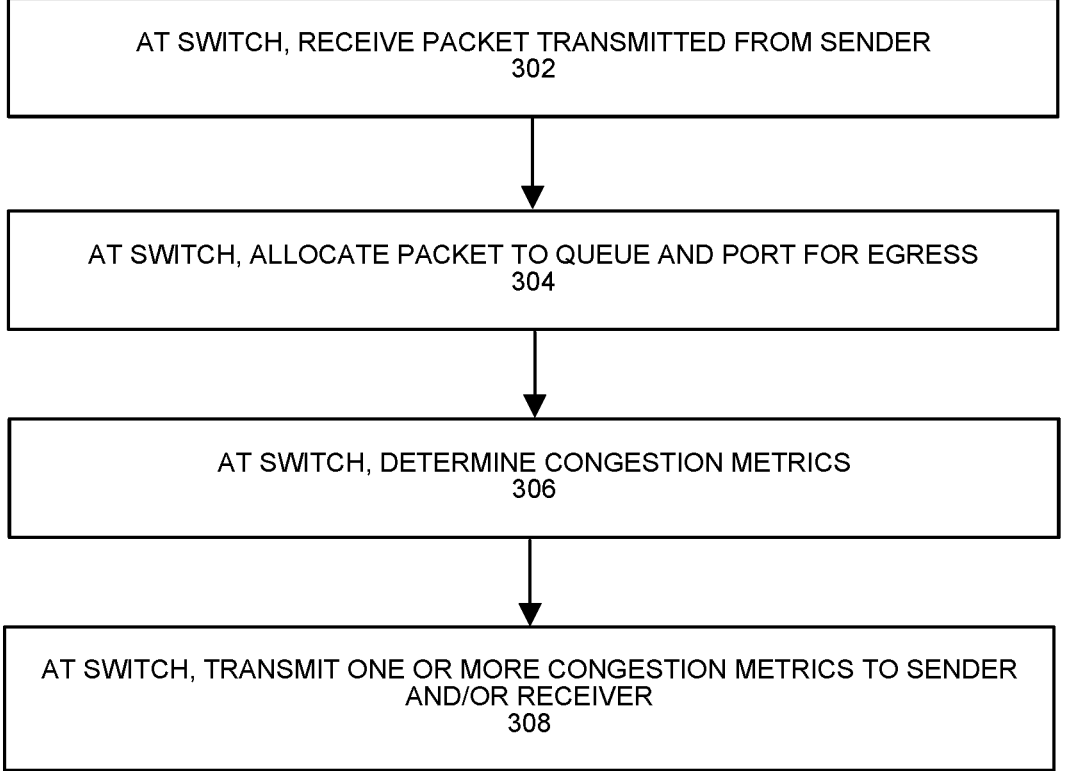
FIG. 3 depicts an example process.

FIG. 3 depicts an example process. At 302, a switch can receive packets to forward from one or more senders. At 304, the switch can allocate the packets to a queue to be transmitted from an egress port. At 308, the switch can determine congestion metrics. The congestion metrics can represent (a) level of congestion and (b) available bandwidth (BW) or current transmit (TX) rate and (b) transmit congestion metrics. In some examples, congestion metrics can be identified per-egress port and/or per-queue. In some examples, congestion metrics can be identified based on receipt of a control message such as CTS or RTS or other conditions such as congestion notification or detection of congestion. At 308, the switch can send one or more of the congestion metrics to a sender and/or receiver. For example, congestion metrics can be sent using one or more of: INT, a header or payload of one or more data packets, CTS, RTS, and other packets.

In response to receipt of congestion metrics, the sender can adjust its transmit rate of packets of a flow directed to the queue or port associated with the congestion metrics. For example, the sender can adjust the transmit rate within one baseline round trip time (RTT). In some cases, the sender can increase transmit rate if the congestion metrics indicate congestion is lessening. In some cases, the sender can reduce transmit rate if the congestion metrics indicate congestion is increasing.

Figure 4:
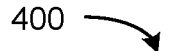
FIG. 4 depicts an example switch.
Figure 4:
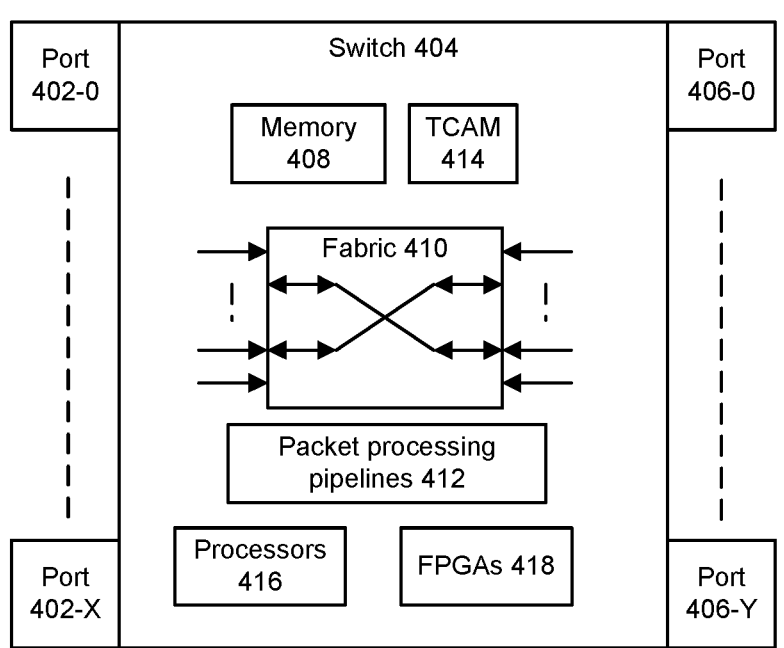

FIG. 4 depicts an example switch. For example, components of the switch can be implemented as an integrated circuit, integrated circuits coupled by interconnects, and/or a system on chip (SoC). Various examples can be used in or with the switch to (a) determine, per-egress-port and/or queue, congestion metrics to represent (i) level of congestion and (ii) available bandwidth (BW) or current transmit (TX) rate and (b) transmit congestion metrics to a sender or receiver, as described herein. Switch can receive a single packet from the source and sends one copy to each one of the recipients. Switch 400 can route packets or frames of any format or in accordance with any specification from any port 402-0 to 402-X to any of ports 406-0 to 406-Y (or vice versa). Any of ports 402-0 to 402-X can be connected to a network of one or more interconnected devices. Similarly, any of ports 406-0 to 406-Y can be connected to a network of one or more interconnected devices.

In some examples, switch fabric 410 can provide routing of packets from one or more ingress ports for processing prior to egress from switch 400. Switch fabric 410 can be implemented as one or more multi-hop topologies, where example topologies include torus, butterflies, buffered multi-stage, etc., or shared memory switch fabric (SMSF), among other implementations. SMSF can be any switch fabric connected to ingress ports and all egress ports in the switch, where ingress subsystems write (store) packet segments into the fabric's memory, while the egress subsystems read (fetch) packet segments from the fabric's memory.

Memory 408 can be configured to store packets received at ports prior to egress from one or more ports. Packet processing pipelines 412 can determine which port to transfer packets or frames to using a table that maps packet characteristics with an associated output port. Packet processing pipelines 412 can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines 412 can implement access control list (ACL) or packet drops due to queue overflow. As described herein, packet processing pipelines 412, processors 416, and/or FPGA 418 can be configured to (a) determine, per-egress-port and/or queue, congestion metrics to represent (i) level of congestion and (ii) available bandwidth (BW) or current transmit (TX) rate and (b) cause transmission of congestion metrics to a sender or receiver, as described herein. Congestion metrics can be determined based on receipt of a control message or other triggers such as congestion notification or determination of congestion at a port or queue.

Configuration of operation of packet processing pipelines 412, processors 416, and/or FPGA 418 can be programmed using Programming Protocol-independent Packet Processors (P4), C, Python, Broadcom Network Programming Language (NPL), or x86 compatible executable binaries or other executable binaries. Processors 416 and FPGAs 418 can be utilized for packet processing or modification.

Figure 5:
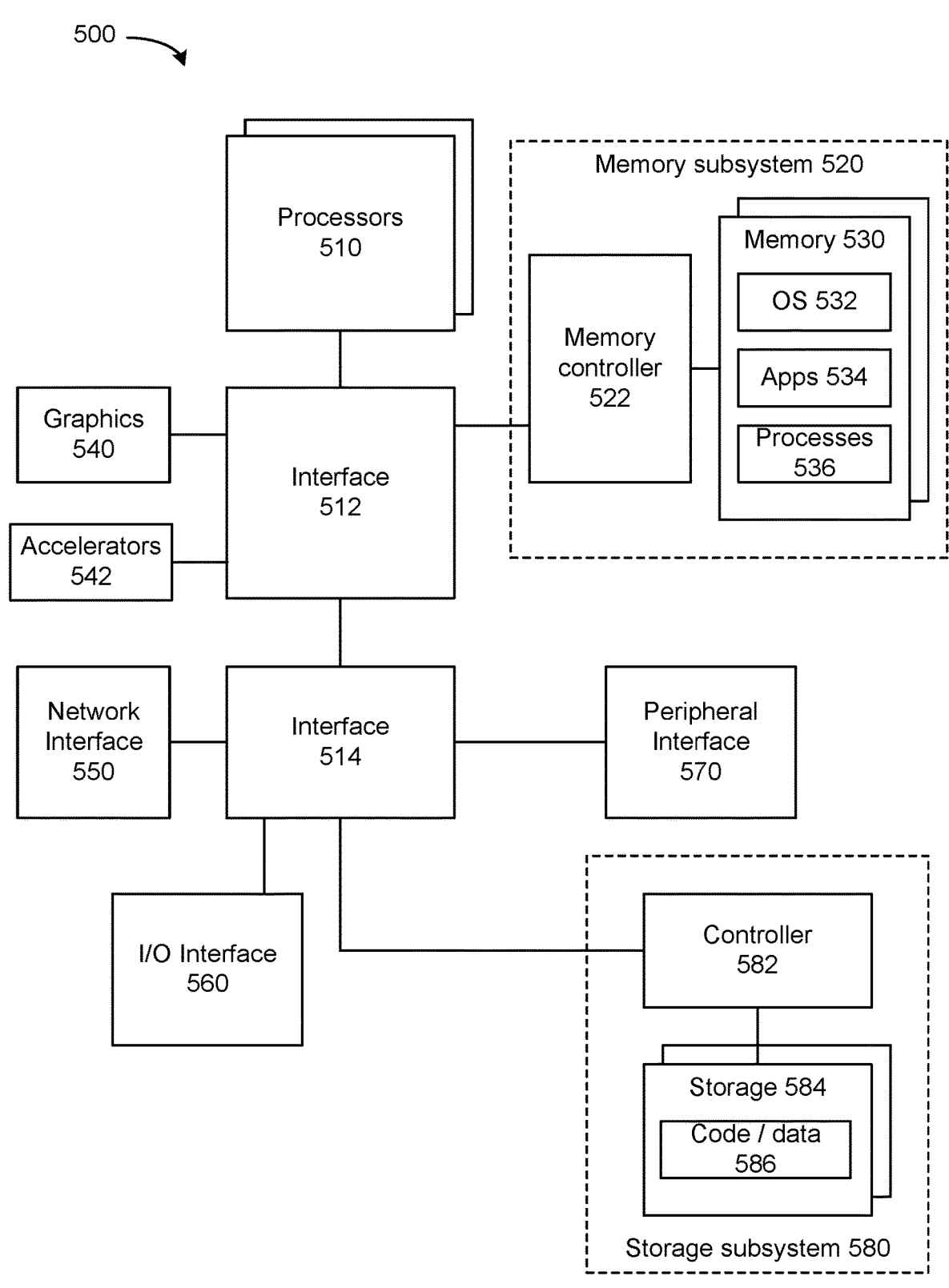
FIG. 5 depicts an example system.

FIG. 5 depicts a system. The system can use embodiments described herein to configure a sender network interface device to transmit packets to a receiver network interface device, to process packets received by the receiver network interface device, and/or configure a switch to determine congestion metrics based on particular triggers (e.g., receipt of a control message or congestion message) and send one or more congestion metrics to a sender and/or receiver network interface device, as described herein. System 500 includes processors 510, which provides processing, operation management, and execution of instructions for system 500. Processors 510 can include any type of microprocessor, central processing unit (CPU), graphics processing unit (GPU), XPU, processing core, or other processing hardware to provide processing for system 500, or a combination of processors. An XPU can include one or more of: a CPU, a graphics processing unit (GPU), general purpose GPU (GPGPU), and/or other processing units (e.g., accelerators or programmable or fixed function FPGAs). Processors 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices. Processors 510 can include one or more processor sockets.

In some examples, interface 512 and/or interface 514 can include a switch (e.g., CXL switch) that provides device interfaces between processors 510 and other devices (e.g., memory subsystem 520, graphics 540, accelerators 542, network interface 550, and so forth). Connections provide between a processor socket of processors 510 and one or more other devices can be configured by a switch controller, as described herein.

In one example, system 500 includes interface 512 coupled to processors 510, which can represent a higher speed interface or a high throughput interface for system components that needs higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a display that provides an output to a user. In one example, the display can include a touchscreen display. In one example, graphics interface 540 generates a display based on data stored in memory 530 or based on operations executed by processors 510 or both. In one example, graphics interface 540 generates a display based on data stored in memory 530 or based on operations executed by processors 510 or both.

Accelerators 542 can be a programmable or fixed function offload engine that can be accessed or used by a processors 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 542 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processors 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It will be understood that memory controller 522 could be a physical part of processors 510 or a physical part of interface 512. For example, memory controller 522 can be an integrated memory controller, integrated onto a circuit with processors 510.

In some examples, OS 532 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on one or more processors sold or designed by Intel®, ARM®, AMD®, Qualcomm®, IBM®, Nvidia®, Broadcom®, Texas Instruments®, among others.

Applications 534 and/or processes 536 can refer instead or additionally to a virtual machine (VM), container, microservice, processor, or other software. Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 500 includes interface 514, which can be coupled to interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 can receive data from a remote device, which can include storing received data into memory. As described herein, network interface 550 can be a sender network interface that adjusts a transmit rate of packets of a flow based on received congestion metrics. As described herein, network interface 550 can be a receiver network interface that forwards received congestion metrics to a sender network interface device.

In some examples, network interface 550 can be implemented as a network interface controller, network interface card, a host fabric interface (HFI), or host bus adapter (HBA), and such examples can be interchangeable. Network interface 550 can be coupled to one or more servers using a bus, PCIe, CXL, or DDR. Network interface 550 may be embodied as part of a system-on-a-chip (SoC) that includes one or more processors, or included on a multichip package that also contains one or more processors.

Some examples of network device 550 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (e.g., the value is retained despite interruption of power to system 500). Storage 584 can be generically considered to be a "memory," although memory 530 is typically the executing or operating memory to provide instructions to processors 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processors 510 or can include circuits or logic in processors 510 and interface 514.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri- Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, or NVM devices that use chalcogenide phase change material (for example, chalcogenide glass).

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as Non-volatile Memory Express (NVMe) over Fabrics (NVMe-oF) or NVMe.

In an example, system 500 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Some examples can include a switch circuitry (e.g., SoC) that is to identify packet as including a control message and based on receipt of the control message, determine port and/or queue congestion metrics. In some examples, a control message can include CTS and/or RTS. In some examples, the switch circuitry can identify a control message based on content of a header field of the packet. For example, the header field can be part of a header field in a packet transmitted end-to-end using RDMA, or RoCE v2, or a reliable transport protocol. Port congestion metrics can represent (a) a level of port congestion and (b) available bandwidth (BW) at the port. Queue congestion metrics can represent (a) a level of queue congestion and (b) available bandwidth (BW) at the queue. The switch circuitry can cause the port and/or queue congestion metrics to be sent to the sender and/or a receiver of the packet transmitted end-to-end.

Example 1 includes one or more examples, and includes a switch circuitry comprising: circuitry to determine if a received packet comprises a control packet; circuitry to determine congestion metrics based on receipt of at least one control packet, wherein the at least one control packet comprises a Request To Send (RTS) or Clear To Send (CTS); and circuitry to transmit at least one of the congestion metrics in at least one packet.

Example 2 includes one or more examples, wherein the congestion metrics comprise per-port congestion metrics comprising one or more of: transmit rate, available bandwidth, traffic arrival rate, incast ratio, number of received flows, congestion locator comprising node identifier, or port identifier.

Example 3 includes one or more examples, wherein the congestion metrics comprise per-queue congestion metrics comprising one or more of: transmit rate, available bandwidth, traffic arrival rate, incast ratio, number of received flows, congestion locator comprising node identifier, or queue identifier.

Example 4 includes one or more examples, wherein the at least one packet comprises one or more of: a communication consistent with In-band Network Telemetry (INT), a header or payload of one or more data packets, CTS, or RTS.

Example 5 includes one or more examples, wherein the circuitry to transmit at least one of the congestion metrics in at least one packet is to transmit at least one of the congestion metrics in at least one packet based on one or more of:

a queue depth, receipt of a Priority Flow Control (PFC) message, and/or a packet drop.

Example 6 includes one or more examples, wherein the circuitry to transmit at least one of the congestion metrics in at least one packet is to transmit the at least one packet to a sender network interface device and/or receiver network interface device.

Example 7 includes one or more examples, and includes a switch, wherein the switch comprises the switch circuitry and one or more ingress and egress ports.

Example 8 includes one or more examples, wherein the switch comprises one or more of: network interface controller (NIC), SmartNIC, router, forwarding element, infrastructure processing unit (IPU), or data processing unit (DPU).

Example 9 includes one or more examples, and includes a sender network interface device that is to receive the at least one of the congestion metrics and adjust a transmit rate of packets based on the at least one of the congestion metrics.

Example 10 includes one or more examples, and includes a server communicatively coupled to the sender network interface device, wherein the server is configured to cause transmission of the at least one control packet and at least one data packet to the switch circuitry.

Example 11 includes one or more examples, and includes a data center, wherein the data center includes the switch circuitry, the sender network interface device, and a receiver network interface device that is to receive the at least one data packet and the at least one control packet.

Example 12 includes one or more examples, and includes a method comprising: tracking, at a switch circuitry, congestion and bandwidth metrics to represent (a) level of congestion and (b) available bandwidth (BW) and in response to receipt of a control packet, causing transmission, by the switch circuitry, at least one of the congestion and bandwidth metrics to sender and/or receiver devices.

Example 13 includes one or more examples, wherein the congestion and bandwidth metrics comprise per-port congestion and bandwidth metrics comprising one or more of: transmit rate, available bandwidth, traffic arrival rate, incast ratio, number of received flows, congestion locator comprising node identifier, or port identifier.

Example 14 includes one or more examples, wherein the congestion and bandwidth metrics comprise per-queue congestion and bandwidth metrics comprising one or more of: transmit rate, available bandwidth, traffic arrival rate, incast ratio, number of received flows, congestion locator comprising node identifier, or queue identifier.

Example 15 includes one or more examples, wherein the causing transmission, by the switch circuitry, at least one of the congestion and bandwidth metrics to sender and/or receiver devices causes adjustment of transmit rate within a congestion free round trip time (RTT).

Example 16 includes one or more examples, and includes a computer-readable medium comprising instructions stored thereon, that if executed by one or more processors, cause the one or more processors to: configure circuitry of a switch to: determine congestion metrics based on receipt of at least one control packet, wherein the at least one control packet comprises a Request To Send (RTS) or Clear To Send (CTS) and cause transmission of at least one of the congestion metrics in at least one packet.

Example 17 includes one or more examples, wherein the congestion metrics comprise per-port congestion metrics comprising one or more of: transmit rate, available bandwidth, traffic arrival rate, incast ratio, number of received flows, congestion locator comprising node identifier, or port identifier.

Example 18 includes one or more examples, wherein the congestion metrics comprise per-queue congestion metrics comprising one or more of: transmit rate, available bandwidth, traffic arrival rate, incast ratio, number of received flows, congestion locator comprising node identifier, or queue identifier.

Example 19 includes one or more examples, wherein the at least one packet comprises one or more of: a communication consistent with In-band Network Telemetry (INT), a header or payload of one or more data packets, CTS, or RTS.

Example 20 includes one or more examples, wherein the switch comprises one or more of: network interface controller (NIC), SmartNIC, router, forwarding element, infrastructure processing unit (IPU), or data processing unit (DPU).

What is claimed is:

1. A method comprising:

tracking, at a switch circuitry, congestion and bandwidth metrics to respectively represent both (a) a level of congestion at an egress port or egress queue of the switch circuitry and (b) available bandwidth at the egress port or the egress queue, wherein the available bandwidth at the egress port is based on a link speed of the egress port and transmit rates of packets from egress queues allocated to the egress port and in response to receipt of a control packet, causing transmission, by the switch circuitry, of the congestion and bandwidth metrics to sender and/or receiver devices, wherein the causing transmission, by the switch circuitry, of the congestion and bandwidth metrics to sender and/or receiver devices causes determination of bandwidth of the egress queue and adjustment by the sender device of a packet transmit rate to the egress queue of the switch circuitry.

2. The method of claim 1, wherein the congestion and bandwidth metrics comprise per-egress port congestion and bandwidth metrics and comprise a port identifier and one or more of: transmit rate, available bandwidth, traffic arrival rate, incast ratio, or number of received flows.

3. The method of claim 1, wherein the congestion and bandwidth metrics comprise per-queue congestion and bandwidth metrics and comprise a queue identifier and one or more of: transmit rate, available bandwidth, traffic arrival rate, incast ratio, or number of received flows.

4. The method of claim 1, wherein the control packet comprises a Message Passing Interface (MPI) Request To Send (RTS) or Clear To Send (CTS).

5. The method of claim 1, wherein the adjustment by the sender device of a packet transmit rate to the egress queue of the switch circuitry comprises: based on higher priority traffic in the egress queue, reducing available bandwidth of the egress queue.

6. An apparatus comprising:

a switch circuitry comprising:

at least one interface to an ingress port;

at least one interface to an egress port; and circuitry to track congestion and bandwidth metrics to represent both (a) a level of congestion at an egress port or egress queue of the switch circuitry and (b) available bandwidth at the egress port or egress queue of the switch circuitry, wherein the available bandwidth at the egress port is based on a link speed of the egress port and transmit rates of packets from egress queues allocated to the egress port and in response to receipt of a control packet, cause transmission of at least one of the congestion and bandwidth metrics to sender and/or receiver devices, wherein the cause transmission of at least one of the congestion and bandwidth metrics to sender and/or receiver devices is to cause determination of bandwidth of the egress queue and adjustment by the sender device of a packet transmit rate to the egress port or the egress queue of the switch circuitry.

7. The apparatus of claim 6, wherein the congestion and bandwidth metrics comprise per-egress port congestion and bandwidth metrics and comprise a port identifier and one or more of: transmit rate, available bandwidth, traffic arrival rate, incast ratio, or number of received flows.

8. The apparatus of claim 6, wherein the congestion and bandwidth metrics comprise per-queue congestion and bandwidth metrics and comprise a queue identifier and one or more of: transmit rate, available bandwidth, traffic arrival rate, incast ratio, or number of received flows.

9. The apparatus of claim 6, comprising one or more of: network interface controller (NIC), SmartNIC, router, forwarding element, infrastructure processing unit (IPU), or data processing unit (DPU).

10. The apparatus of claim 6, wherein the control packet comprises a Message Passing Interface (MPI) Request To Send (RTS) or Clear To Send (CTS).

11. At least one non-transitory computer-readable medium comprising instructions stored thereon, that if executed by one or more processors, cause the one or more processors to:
    configure circuitry of a switch to:
        track congestion and bandwidth metrics to represent both (a) a level of congestion at an egress port or egress queue of the circuitry of the switch and (b) available bandwidth at the egress port or egress queue of the circuitry of the switch, wherein the available bandwidth at the egress port is based on a link speed of the egress port and transmit rates of packets from egress queues allocated to the egress port and
    in response to receipt of a control packet, cause transmission of at least one of the congestion and bandwidth metrics to sender and/or receiver devices, wherein the cause transmission of at least one of the congestion and bandwidth metrics to sender and/or receiver devices is to cause determination of bandwidth of the egress queue and adjustment by the sender device of a packet transmit rate to the egress port or the egress queue of the switch.

12. The computer-readable medium of claim 11, wherein the congestion and bandwidth metrics comprise per-egress port congestion and bandwidth metrics and comprise a port identifier and one or more of: transmit rate, available bandwidth, traffic arrival rate, incast ratio, or number of received flows.

13. The computer-readable medium of claim 11, wherein the congestion and bandwidth metrics comprise per-queue congestion and bandwidth metrics and comprise a queue identifier and one or more of: transmit rate, available bandwidth, traffic arrival rate, incast ratio, or number of received flows.

14. The computer-readable medium of claim 11, wherein the switch comprises one or more of: network interface controller (NIC), SmartNIC, router, forwarding element, infrastructure processing unit (IPU), or data processing unit (DPU).

15. The computer-readable medium of claim 11, wherein the control packet comprises a Message Passing Interface (MPI) Request To Send (RTS) or Clear To Send (CTS).

\* \* \* \* \*